United States Patent

Matsuyama et al.

[11] Patent Number: 5,133,814
[45] Date of Patent: Jul. 28, 1992

[54] SOFT MAGNETIC THIN FILM

[75] Inventors: Hideaki Matsuyama; Hideaki Karamon, both of Miyagi, Japan

[73] Assignee: Sony Corporation, Tokyo, Japan

[21] Appl. No.: 583,877

[22] Filed: Sep. 17, 1990

[30] Foreign Application Priority Data

Sep. 20, 1989 [JP] Japan .................... 1-24461

[51] Int. Cl.$^5$ ............................ C22C 1/10
[52] U.S. Cl. .................... 148/305; 148/304; 148/403; 148/307; 148/309; 148/313; 148/315
[58] Field of Search ............... 148/304, 305, 307, 309, 148/313, 315, 403

[56] References Cited

U.S. PATENT DOCUMENTS 4,217,151  8/1980  Mizuno et al. ............... 148/305

FOREIGN PATENT DOCUMENTS 0167118  1/1986  European Pat. Off. .

OTHER PUBLICATIONS

Journal of Applied Physics, vol. 64, No. 8, 15 Oct. 1988, New York, USA, pp. 4251–4253; R. L. Holtz et al., "Amorphous Iron Particles in Cosputtered Fe-S102 films".

Primary Examiner—R. Dean
Assistant Examiner—Sikyin Ip
Attorney, Agent, or Firm—Philip M. Shaw, Jr.

[57] ABSTRACT

A novel soft magnetic amorphous alloy thin film which, on account of the composition of the film consisting in a combination of a transition metal, a metalloid or semiconducting element, namely B, C or Si and an oxide derived from the starting material, is endowed with a comminuted and dispersed structure of a magnetic amorphous phase and a nonmagnetic amorphous phase. The soft magnetic amorphous alloy thin film may be applied to a magnetic head for short wavelength recording which is required to cope with high frequency characteristics and high coercivity of the recording medium.

7 Claims, 6 Drawing Sheets

SOFT MAGNETIC THIN FILM

BACKGROUND OF THE INVENTION

1. Field of the Invention

This invention relates to a soft magnetic thin film used as, for example, a core material for a magnetic head. More particularly, it relates to a novel soft magnetic amorphous alloy thin film having a high magnetic flux density and a high electrical resistivity.

2. Related Art Statement

In a magnetic recording/reproducing apparatus, such as a video tape recorder (VTR), research towards raising the density or the frequency of the recording signals for improving the image quantity is progressing. In keeping pace therewith, research and development of a so-called metal tape in which powders of magnetic metals, such as Fe, Co or Ni, are used as magnetic powders, or a so-called evaporated tape, in which a magnetic metal material is directly deposited by, for example, vacuum evaporation, on the base film, is advancing briskly.

Meanwhile, it may be contemplated that, with the tendency towards a higher coercivity of the magnetic recording medium, a higher saturation magnetic flux density is required of the material for a magnetic head employed for recording and/or reproduction. The ferrite material, which is frequently employed as the magnetic head material, has only a low saturation magnetic flux density, such that it is difficult to produce a soft magnetic material having a saturation magnetic flux density exceeding 5000 Gauss, so that it is difficult to cope with the tendency towards a higher coercivity of the recording medium satisfactorily.

With this in view, there has also evolved a composite magnetic head in which a magnetic core of the magnetic head is of a composite structure of ferrite or ceramics, and in which soft magnetic thin films having a high saturation magnetic flux density abut on each other to form a magnetic gap, i.e. a thin film magnetic head, in which magnetic cores and coils are formed by a thin film technique and are sandwiched with insulating films in-between to form a multi-layered structure.

As the soft magnetic thin films, there are known an Fe-Al-Si alloy magnetic thin film (so-called Sendust thin film) having a high saturation magnetic flux density, or a permalloy thin film. However, these soft magnetic metallic thin films exhibit a low electrical resistivity of not higher than 100 microhm/cm, because they are of an alloy material, and are deteriorated in magnetic characteristics in the high frequency range, above all, in the frequency range of the order of megahertzes, on account of eddy current losses. Such a deterioration in magnetic characteristics in the high frequency range is extremely inconvenient in view of the required high density recording that is recording at shorter wavelengths.

There has also evolved metal-metalloid amorphous alloy magnetic thin films, such as Fe-B, Fe-Si-B or Fe-Co-Si-B thin films, which are produced by a liquid quenching method or a gas phase quenching method. These films are of a single-phase amorphous structure, which may be said to be a homogeneous structure. The electrical resistivity of these films, while being higher than that of the thin films of Sendust, which is a crystal soft magnetic material, is at most 150 microhms/cm or thereabouts, while their saturation magnetic flux density is 11000 Gauss or thereabouts.

In general, for raising the saturation magnetic flux density of the conventional soft magnetic thin films, it is necessary to increase the amount of magnetic metals, such as Fe or Co, as a result of which the electrical resistivity is lowered. This means that the saturation magnetic flux density and the electrical resistivity represent contradictory properties in the case of the soft magnetic thin films formed of a magnetic alloy material, such that it has been difficult to achieve a high saturation magnetic flux density and a high electrical resistivity simultaneously.

There is also proposed by the present Applicant a method of forming a magnetic film by mixing a magnetic metal material and an insulating material by sputtering, such as a FeCoBN film as described in U.S. Pat. No. 4,620,961 or an FeCoBC or $FeCoB_2C_3$ film as described in U.S. Ser. No. 279,244 corresponding to GB 2198146A.

These soft magnetic thin films, while exhibiting properties superior to those of the aforementioned magnetic alloy thin films or the one-phase amorphous thin films, still leave much to be desired. For example, the FeCoBN and $FeCoB_2C_3$ materials are not satisfactory in soft magnetic properties, whereas the FeCoBC materials are not satisfactory in electrical resistivity.

SUMMARY OF THE INVENTION

It is a principal object of the present invention to provide a novel soft magnetic amorphous alloy thin film which is endowed with a structure wherein, by combining a transition metal, a metalloid element or semiconducting element, that is, B, C or Si and an oxide supplied from the starting material, as the composition of the soft magnetic amorphous alloy thin film, a magnetic amorphous phase and a non-magnetic amorphous phase are dispersed in a comminuted form, and which may be applied to a magnetic head technology for recording at shorter wavelengths required to cope with a high coercivity recording medium or recording at higher frequencies.

In accordance with the present invention, these is provided a soft magnetic thin film having a composition $M_xG_y(LO_v)_z$, wherein M is at least one element selected from the group consisting of Fe and Co, G is at least one element selected from the group consisting of B, Si and P, L is at least one element selected from the group consisting of Si, Al, Zn and Ti and x, y and z represent the percentages of the respective elements in atomic percent, with $x+y+z=100$, $15<y<28$, $2<z<10$ and $0.5<v\leq 2$, and wherein the thin film has a hetero-amorphous two-phase structure comprising a magnetic amorphous phase and a non-magnetic amorphous phase dispersed in a comminuted form.

DETAILED DESCRIPTION OF THE INVENTION

The soft magnetic amorphous alloy thin film of the present invention has been proposed for accomplishing the above object and is characterized in that it has a composition $MxGy(LOv)z$, wherein M stands for at least one of Fe or Co, G stands for at least one of B, Si or P, L stands for at least one of Si, Al, Zn or Ti, and x, y and z stand for contents of the respective elements in atomic percent, with $x+y+z=100$, $15<y<28$, $2<z<10$ and $0.5<v\leq 2$, and in that it exhibits a hetero-amorphous two-phase structure.

In the above formula, 3d transition metal elements, which prove to be magnetic materials, such as one or two of Fe or Co, are preferred as the element M.

One or more of B, Si or P is preferred as the metalloid element G. These metalloid elements are effective to render the alloy more susceptive to be amorphous, while affording soft magnetic properties to the amorphous structure with the transition metal element M.

On the other hand, with the soft magnetic amorphous alloy thin film of the present invention, the percentage y of these metalloid elements G should be $15<y<28$ since, with $y\leq 15$, an amorphous state is not achieved and, with $y\geq 28$, the saturation magnetic flux density becomes lesser than 6000 G.

As the element L, one or more of Si, Al, Zn or Ti is preferred. LOv is an oxide of the element L. Similarly to the metalloid element G, the oxide LOv renders the alloy more susceptive to be amorphous. The electrical resistivity of the thin film may be improved significantly by the addition of a minor amount of the oxide LOv to the MG system amorphous soft magnetic substance. However, soft magnetic properties of the thin film may not be realized in this manner. It is therefore preferred that the percentage z of the oxide LOv be $2<z<10$. If z is less than 2 atomic percent, the electrical resistivity cannot be raised sufficiently, whereas, if z exceeds 10 atomic percent, soft magnetic properties are lowered.

Figure 1:
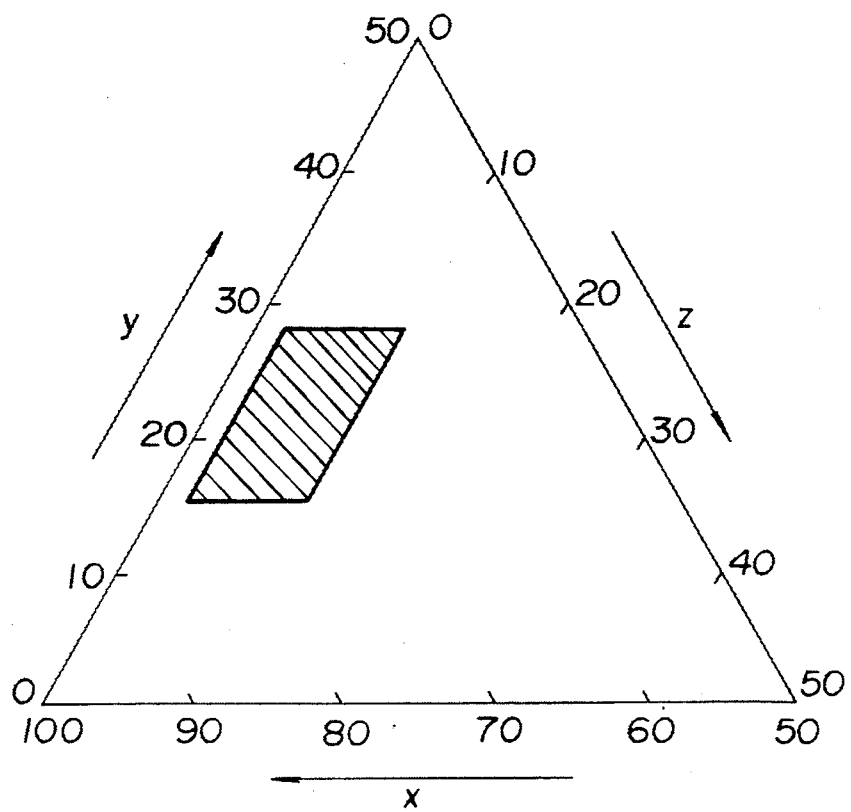
FIG. 1 is a diagram of a ternary system diagram showing a compositional range of the soft magnetic amorphous alloy thin film according to the present invention.

The above defined compositional range is such as shown enclosed by a hatching line in FIG. 1. A soft magnetic amorphous alloy thin film having satisfactory magnetic properties may be obtained by setting the composition so as to be within the region shown in FIG. 1.

Figure 2:
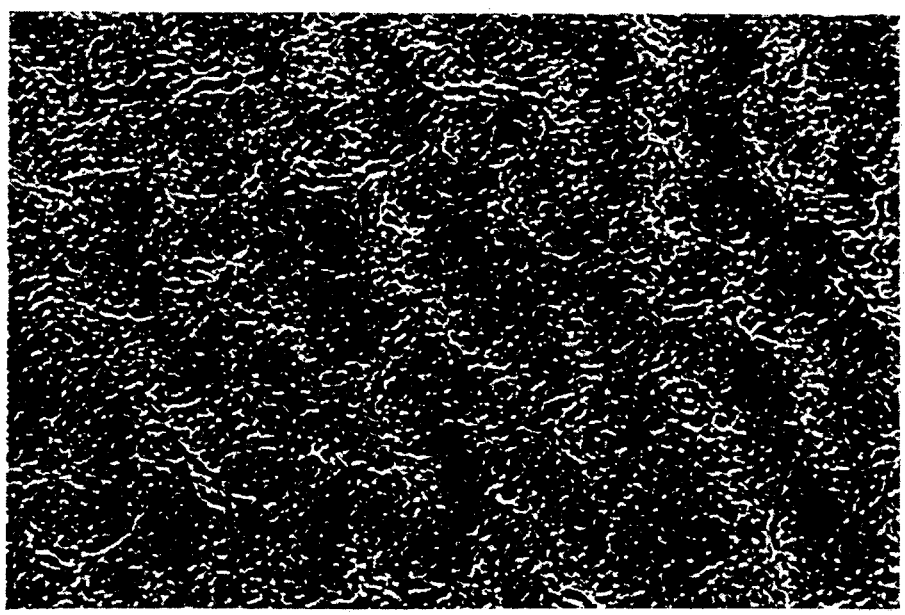
FIG. 2 is a photo, taken by a transmission type electron microscope, of a hetero-amorphous soft magnetic thin film.
Figure 3:
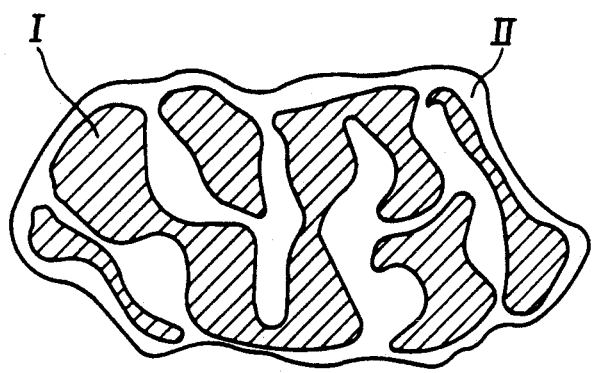
FIG. 3 is a diagrammatic view for illustrating the hetero-amorphous two-phase structure.

In distinction from the hitherto well-known one-phase amorphous magnetic thin film, the soft magnetic amorphous alloy thin film of the present invention may be inferred to be a two-phase hybrid or mixed structure which, as shown in FIG. 3, is comprised of a magnetic amorphous phase I consisting mainly of a transition metal element M (M-G) and a nonmagnetic amorphous phase II surrounding the phase I and composed of an oxide (G-L-O). This is supported by a dark field image, taken by a transmission electron microscope, as shown in FIG. 2. Thus it may be seen from inspection of the photo (magnification factor, $25\times 10^4$) of FIG. 2 that dark regions and light regions exist together in a minute pattern to constitute an ultra-fine hetero-amorphous two-phase structure. It is noted that both of these dark regions and light regions are of an amorphous phase, as has been demonstrated by an electron beam diffraction method.

The soft magnetic amorphous alloy thin film of the present invention is prepared by a sputtering technique using a target comprised of an array of square plates of an oxide (LOv) on an MG base alloy disk. Although it may be contemplated to perform sputtering in an oxygen atmosphere to produce an oxide, oxygen may in this case be bonded preferentially with Fe, so that not only the magnetic properties are lowered considerably, but also it becomes difficult to achieve a high electrical resistivity. The argon gas pressure during sputtering is preferably 2 to 100 mTorr. The amorphous film produced by sputtering is heat-treated at a temperature not higher than the crystallization temperature of the film material.

The soft magnetic amorphous alloy thin film of the present invention may be inferred to be a two-phase hybrid structure or mixed structure comprised of a magnetic amorphous phase I consisting mainly of the transition metal element M (M-G) and a nonmagnetic amorphous phase II surrounding the phase I and composed of a metalloid element G and an oxide $LO_v$ (G-L-O), as shown in FIG. 3. By such a mixed structure, superior characteristics may be displayed which cannot be realized with the conventional one-phase amorphous magnetic thin film.

Thus the magnetic amorphous phase I of a low electrical resistivity is interrupted by the nonmagnetic amorphous phase II of a high electrical resistivity so that the film as a whole exhibits a high electrical resistivity.

On the other hand, although the magnetic amorphous phase I is interrupted electrically by the nonmagnetic amorphous phase II, adjacent regions of the phase I formed by interruption are spaced apart by an extremely small distance and are connected to one another magnetically, such that the magnetic properties, above all, the saturation magnetic flux density, of the film as a whole are higher than those of the metal-metal system one-phase amorphous magnetic thin film, such as CoZrNb. In general, the crystal soft magnetic thin film, such as the Sendust thin film, exhibits uniaxial anisotropy that is, directivity, in its magnetic properties, on account of its crystal magnetic anisotropy. Conversely, the soft magnetic amorphous alloy within the film of the present invention exhibits magnetically isotropic soft magnetic properties in the film surface, since the film material is amorphous and the magnetic amorphous phase I is dispersed finely. These isotropic soft magnetic properties may not be realized with the conventional crystal magnetic soft thin film or a one-phase amorphous magnetic thin film.

EXAMPLE

An Example of the present invention will be explained with reference to the accompanying drawings.

In the present Example, an amorphous thin film of the composition $(Co_{0.8}Fe_{0.2})_x B_y (SiO_2)_z$ is formed. In the above formula, the transition metal element M is $Co_{0.8}Fe_{0.2}$ and the metalloid element G is B, while the oxide of L is $SiO_2$, with $x+y+z=100$.

First, a CoFeB alloy and an oxide of L were as targets, and were used sputtered simultaneously by the RF magnetron sputtering method to produce an amorphous thin film.

As the targets for sputtering, 4 to 80 $SiO_2$ square pieces, each having a side edge length of 5 mm, were arrayed on a disk of $Co_{0.8}Fe_{0.2}$ which was 3 inches in diameter and 2 mm in thickness. As a substrate, a crystal glass 30 mm by 3 mm by 0.5 mm, a quartz glass 10 mm by 10 mm by 1 mm or pyrex glass 25 mm by 40 mm by 1 mm could be used.

The following sputtering conditions were employed.

| | |
|---|---|
| incident wave power | 100–400 W |
| reflected wave power | 1–4 W |
| vacuum reached | $7 \times 10^{-7}$ Torr or lower |
| electrode-to-electrode distance | 50 mm |
| pre-sputtering time | 30 minutes |
| sputtering time | 0.5 to 3 hours |
| argon gas pressure | 2 to 100 mTorr |
| substrate temperature | water-cooled |

The film prepared by sputtering was examined by X-ray diffraction as to whether it was crystal or amorphous.

The amorphous film such as that described above was heat-treated under predetermined conditions.

Figure 4:
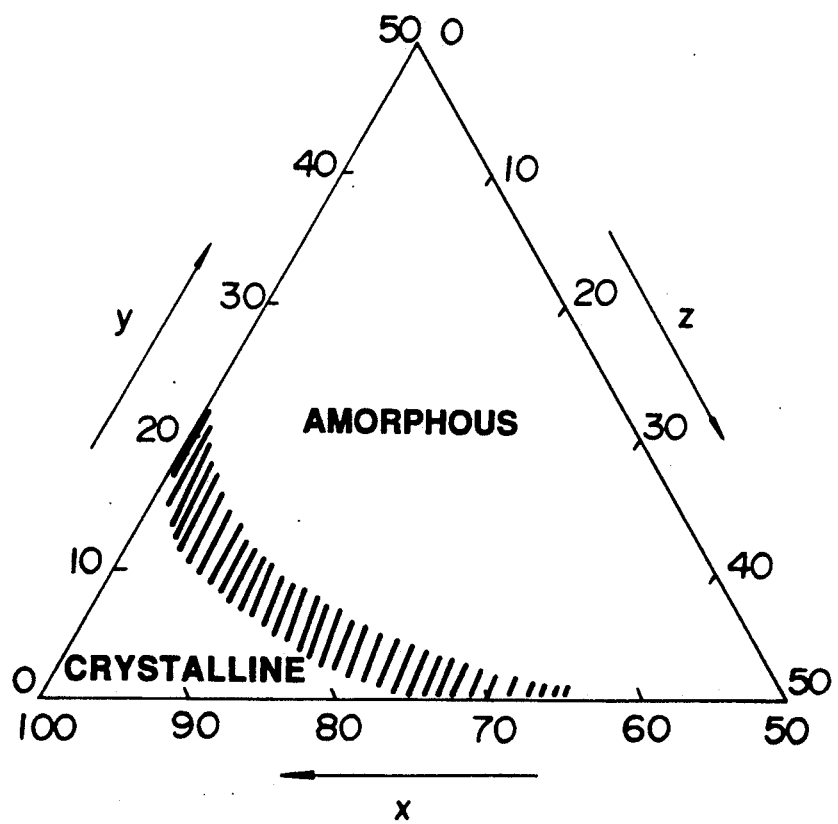
FIG. 4 is a ternary system diagram showing the compositional range of a $(Co_{0.8}Fe_{0.2})x$ By $(SiO)z$ thin film in which the structure becomes amorphous.

FIG. 4 shows the results of the above-mentioned X-ray diffraction analyses of the films produced with varoius different compositional ratios. As shown in FIG. 4, if the $SiO_2$ contents are in the range of 0 to 50 atomic percent, the film produced by sputtering becomes amorphous, event with reduced B contents. This it may be seen that, besides the metalloid elements, the oxides are also effective in forming an amorphous structure. This amorphous alloy thin film is destitute of crystal magnetic anisotropy, so that at tends to exhibit soft magnetic properties.

Figure 5:
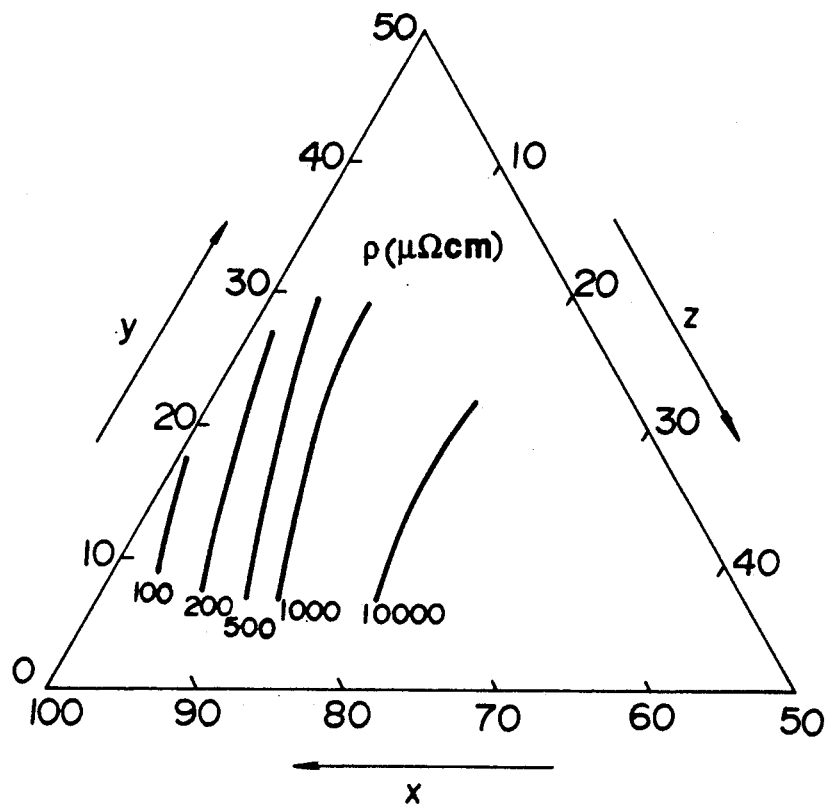
FIG. 5 is a ternary system diagram showing an electrical resistivity for each of the compositions.

FIG. 5 shows the values of electrical resistivity for the various compositional ratios. It may be seen from FIG. 5 that, with increase in the oxide contents, the electrical resistivity tends to be increased significantly. It is noted that, in the hatched region of FIG. 1, the electrical resistivity is of the order of 150 to 2000 $\mu\Omega$ cm, which is higher than the corresponding value of the conventional soft magnetic metallic material.

Figure 6:
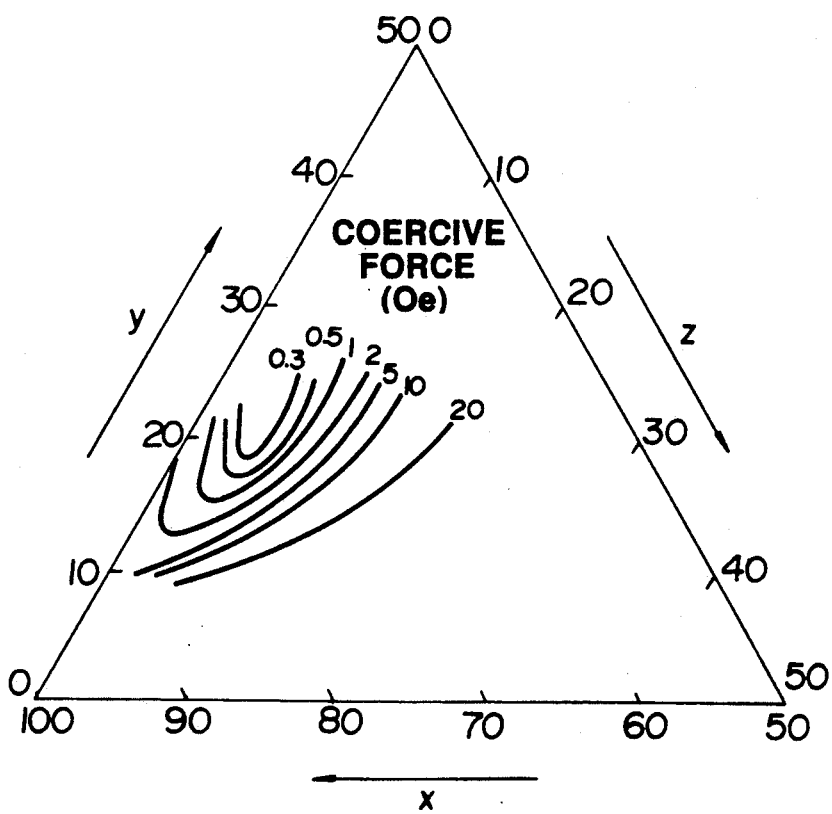
FIG. 6 is ternary system diagram showing a coercive force for each of the compositions.

FIG. 6 shows the coercive force for various different compositional ratios. Referring to FIG. 6, with no metalloid element contents (y=0), the coercive force becomes higher than 20 Oe for the region of higher oxide contents of 35 atomic percent or higher (with the exclusion of the region exhibiting ultra-paramagnetism). On the other hand, since there is a region exhibiting a coercive force of not more than 10 Oe in the region of FIG. 1 having metalloid element contents, soft magnetic properties may be realized with the $(Co_{0.8}Fe_{0.2})_x B_y (SiO_2)_z$ amorphous thin film.

Figure 7:
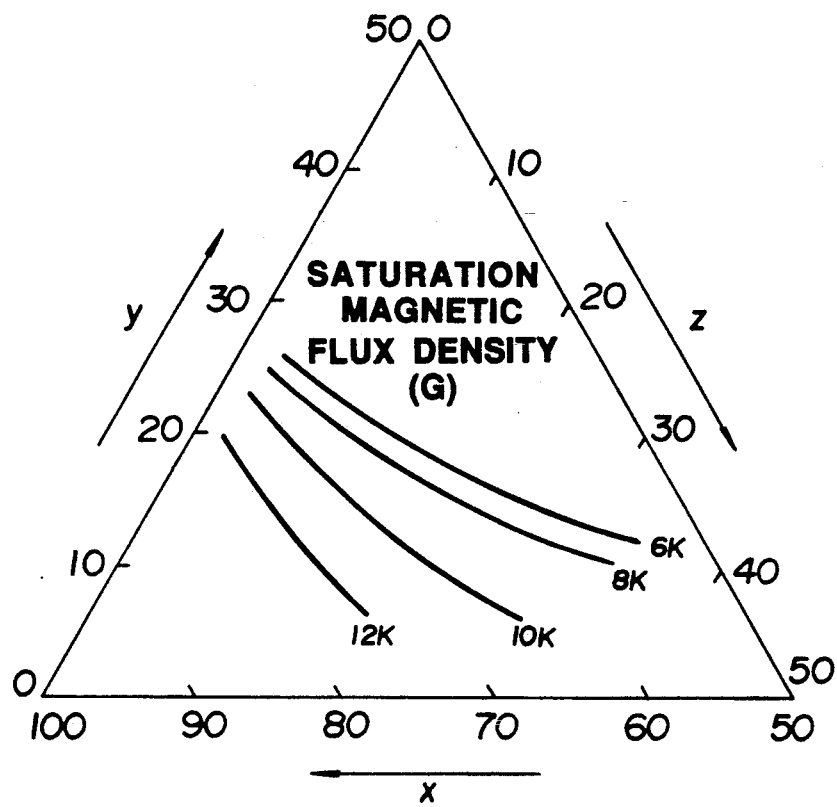
FIG. 7 is a ternary system diagram showing a saturation magnetic flux density for each of the compositions.

FIG. 7 shows the saturation magnetic flux density for various different compositional ratios. It is seen from FIG. 7 that the saturation magnetic flux density is approximately proportional to the transition metal element contents. Within the hatched region shown in FIG. 1, the saturation magnetic flux density reaches a higher value of not less than 6000 Gauss.

Figure 8:
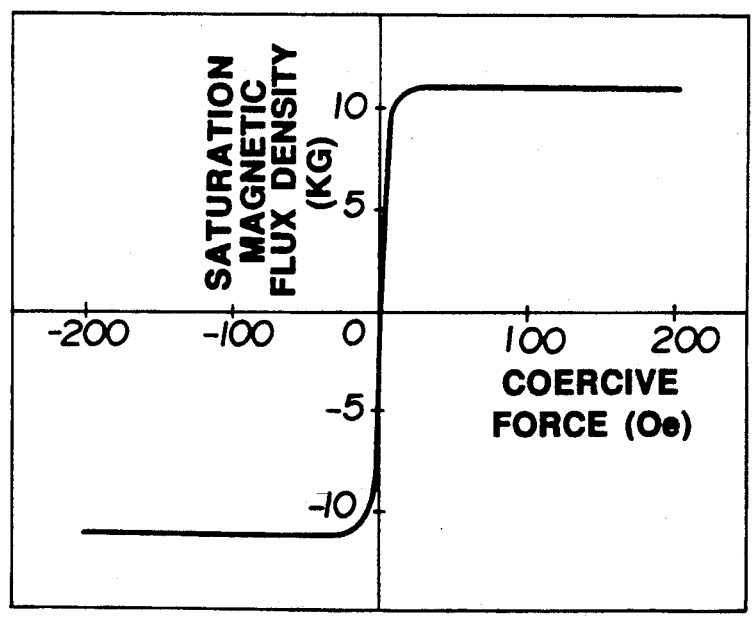
FIG. 8 is a diagram showing hysteresis characteristics.
Figure 9:
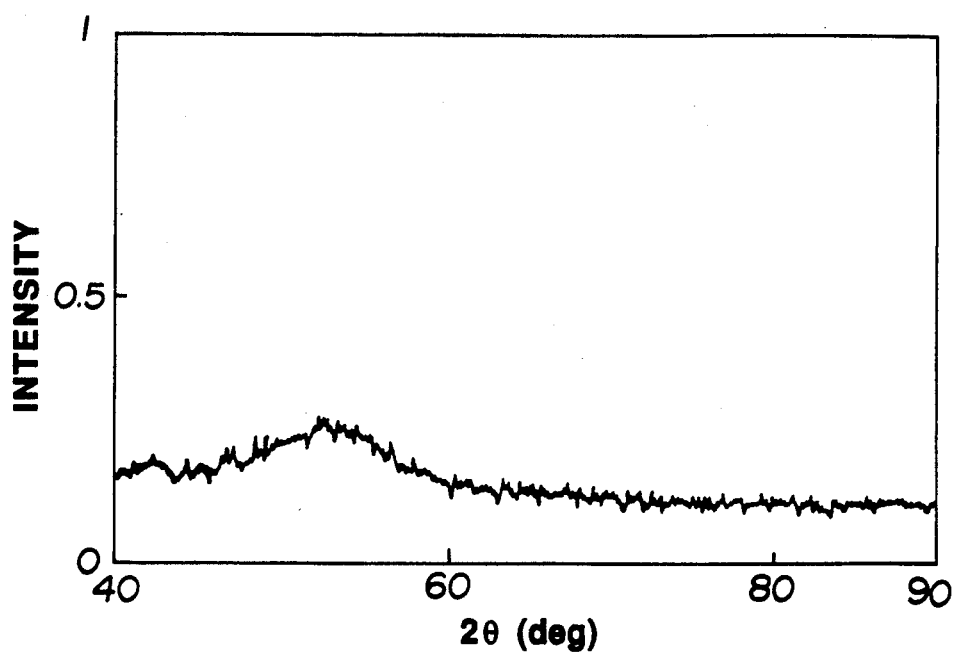
FIG. 9 is a diagram showing the X-ray diffraction spectrum characteristic of a soft magnetic amorphous alloy thin film having a composition of $Co_{0.8}Fe_{0.2}:B:SiO_2 = 76:18:6$.

FIGS. 8 and 9 are diagrams showing the results of the X-ray diffraction analyses and hysteresis curves of the amorphous thin film having the composition $Co_{0.8}Fe_{0.2}:B:SiO_2=76:18:6$, respectively. The halo-shaped curve of FIG. 8 proper to the amorphous material indicates that the film represented by the above composition is amorphous. As shown in FIG. 9, the film has a saturation magnetic flux density of 11000 Gauss and a coercive force of 0.2 Oe so that it is superior in soft magnetic properties.

Figure 10:
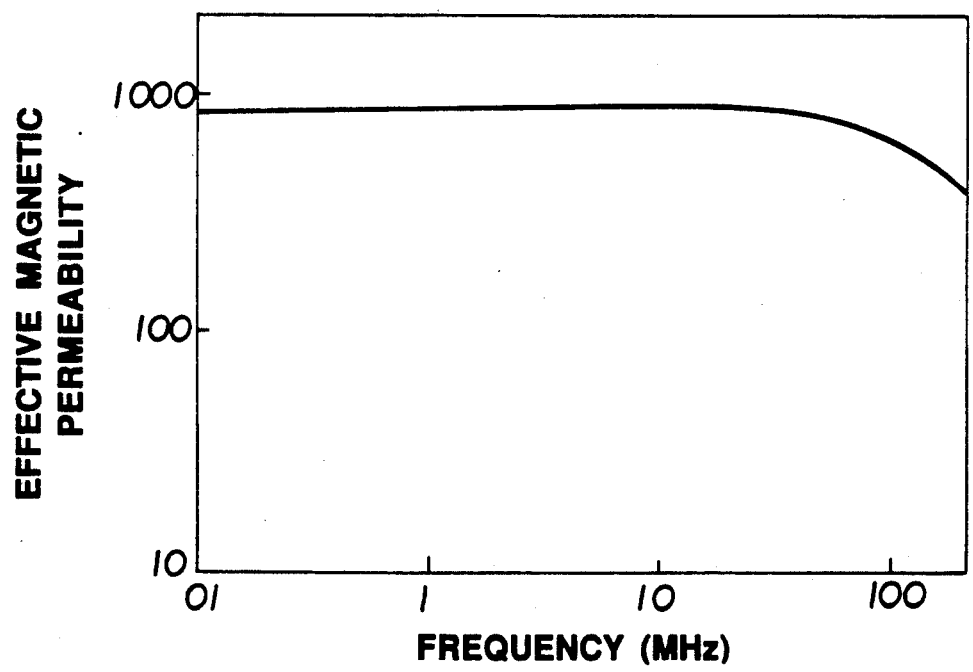
FIG. 10 is a diagram showing the relation between the frequency and effective permeability.

In FIG. 10, the frequency is plotted on the horizontal axis, while the effective permeability is plotted on the vertical axis. As shown in FIG. 10, the effective permeability equal to about 800 extends substantially to the high frequency region of 50 MHz. Thus the magnetic thin film has a high effective permeability in the high frequency region. The film thickness is 4 $\mu$m.

Figure 11:
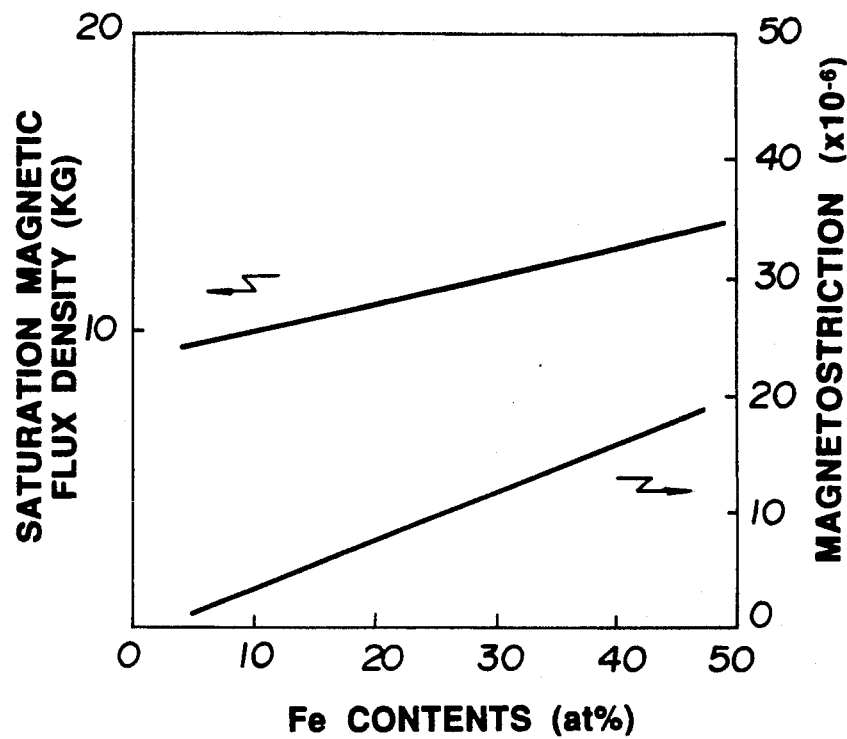
FIG. 11 is a diagram showing the relation between the Co-Fe compositional ratio and the saturation magnetic flux density-magnetostriction in a further example of the soft magnetic amorphous alloy thin film of the present invention.

The effect of changing the Co-Fe compositional ratio, with the composition $CoFe:B:SiO_2=74.5:19:6.5$, is hereinafter inspected with reference to FIG. 11. FIG. 11 shows the relation of the saturation magnetic flux density and magnetostriction, both plotted on the vertical axis, with the CoFe compositional ratio plotted on the horizontal axis. It is seen from FIG. 11 that, with the Fe contents in the transition elements in the range of 0 to 50 atomic percent, the saturation magnetic flux density and the magnetostriction tend to be increased in proportion to the increase in Fe contents. Thus the magnetostriction may be adjusted by changing the Co-Fe mixing ratio.

Figure 12:
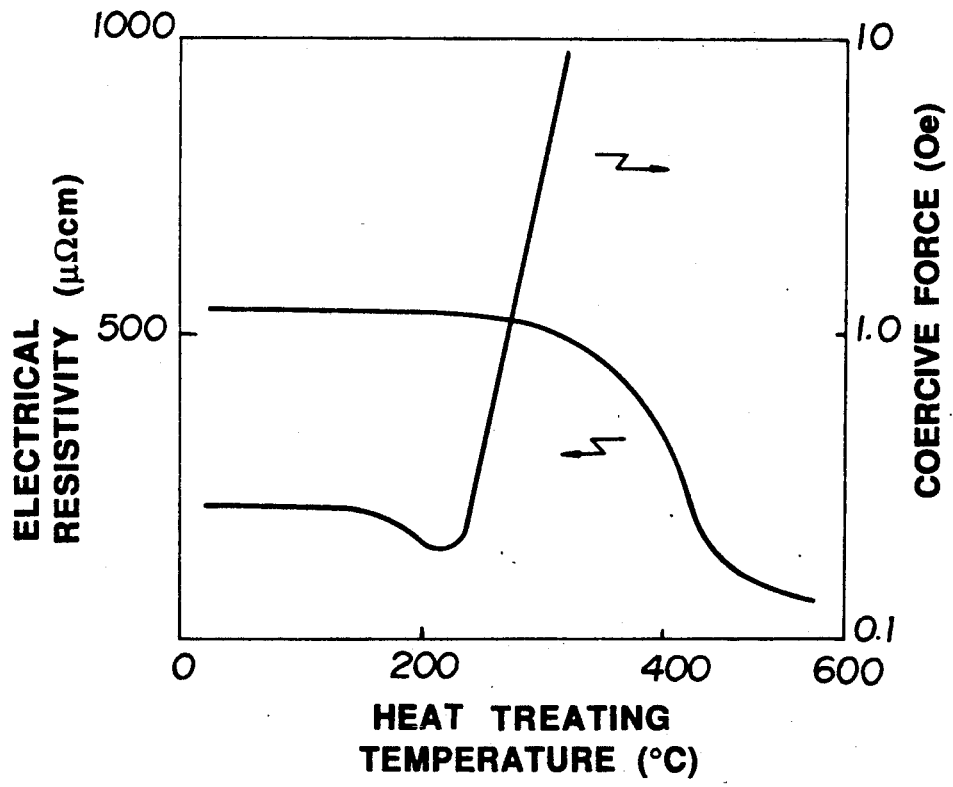
FIG. 12 is a diagram showing changes in the electrical resistivity and coercive force of the soft magnetic amorphous alloy thin film of the composition $Co_{0.8}Fe_{0.2}:B:SiO_2 = 76:18:6$ with respect to the heat-treatment temperature.

FIG. 12 shows the relation between the heat treatment temperature (°C.) plotted on the horizontal axis and the electrical resistivity and the coercive force, both plotted on the vertical axis, during heat treatment of an amorphous thin film having the composition $Co_{0.8}Fe_{0.2}:B:SiO_2=76:18:6$ with the use of a $Co_{0.8}Fe_{0.2}$ magnetic metal material. The heat-treating times is one hour. As shown in FIG. 12, the electrical resistivity is constant at approximately 500 $\mu\Omega$ cm at the heat-treating temperature of 250° C. or lower, and is decreased acutely at the heat-treating temperature of 250° C. or higher. On the other hand, the coercivity becomes lowest at approximately 220° C. Hence, with the above composition, the heat-treating temperature of 220° C. is most desirable. It is noted that the optimum heat-treating temperature is changed with the compositional ratio of the amorphous film.

Thus the soft magnetic amorphous alloy thin film of the present embodiment shows soft magnetic properties of a high electrical resistivity and a high saturation magnetic flux density and thus undergoes low losses in the high frequency region within the range of the compositional ratios of $15<y<28$ and $2<z<10$.

When the present invention is applied to a magnetic head or the like, it is necessary to take corrosion resistance, hardness and wear resistance into consideration. For this reason, 3d transition metal elements, such as Cr, Mn or Ti, Mo, Ru, Pd, Hf, Ta, W or Pt may be added to the transition metal element M. The elements contributing to the amorphousness are not limited to the above elements, but metalloids such as C, Ge, As, Sb or Sn, or metals such as Zr, Nb, Ta, Ti, Y, Hf or Pd, may also be employed. As the oxides, oxides of elements such as Ti, Sn, Cr, W, Ta, Mo or V may also be employed.

It will be seen from the foregoing that, with the soft magnetic amorphous alloy thin film of the present invention, which is formed of a transition metal, a metalloid and an oxide and which has a hetero-amorphous two-phase structure of a magnetic amorphous phase and a nonmagnetic amorphous phase, the two properties which are contradictory to each other, namely the high electrical resistivity and the high saturation magnetic flux density, may be achieved simultaneously. Thus a soft magnetic amorphous alloy thin film may be provided which is lesser in eddy current losses and superior in high frequency characteristics and which may be controlled in magnetostriction and may be applied to a magnetic head technology for short wavelength recording.

The soft magnetic amorphous alloy thin film of the present invention may be used satisfactorily with a metal tape having a high coercive force because the film is low in coercive force and has a high saturation magnetic flux density as compared with the Sendust thin film or a one-phase amorphous magnetic thin film.

In addition, the soft magnetic amorphous alloy thin film of the present invention is not crystalline in structure and does not exhibit uniaxial anisotropy due, for example to crystal magnetic anisotropy, so that it may be said to be an isotropic soft magnetic material. Hence, it may be applied advantageously to a magnetic head since there is no necessity of taking the direction of the crystal grains into consideration.

What is claimed is:

1. A soft magnetic thin film having a composition $M_xG_y(LO_v)_z$, wherein
   M is at least one element selected from the group consisting of Fe and Co,
   G is at least one element selected from the group consisting of B, Si and P,
   L is at least one element selected from the group consisting of Si, Al, Zn and Ti,
   and x, y, z represent the percentages of the respective elements in atomic percent, with $x+y+z=100$, $15<y<28$, $2<z<10$, and $0.5<v<2$,
   and wherein the thin film has a hetero-amorphous, two-phase structure comprising a magnetic amorphous phase and a non-magnetic amorphous phase dispersed in a comminuted form,
   and wherein the coercive force of the thin film is less than 1 Oe.

2. A soft magnetic thin film according to claim 1 which is prepared by sputtering using a first solid target consisting essentially of a compound of M and G and a second solid target consisting essentially of a compound of L and O.

3. A soft magnetic thin film according to claim 1 wherein said a hetero-amorphous two-phase structure consists essentially of first regions of an M-G amorphous phase precipitated in second regions of an G-L-O amorphous phase having a high electrical resistivity.

4. A soft magnetic thin film according to claim 2 wherein said first solid target consists essentially of Fe, Co, and B and said second solid target consists essentially of $SiO_2$.

5. A soft magnetic thin film according to claim 2 wherein the argon gas pressure is from 2 mTorr to 100 mTorr.

6. A soft magnetic thin film according to claim 1 where in the thin film has a composition consisting essentially of $Co_{0.8}Fe_{0.2}:B:SiO_2=76:18:6$, respectively.

7. A soft magnetic thin film according to claim 1 where in the thin film has a composition consisting essentially of $Co_{0.8}Fe_{0.2}:B:SiO_2=74.5:19:6.5$, respectively.

* * * * *